United States Patent [19]

Kayane et al.

[11] Patent Number: 4,698,421
[45] Date of Patent: Oct. 6, 1987

[54] FIBER-REACTIVE DISAZO BROWN DYE HAVING VINYLSULFONE-TYPE REACTIVE GROUP

[75] Inventors: Yutaka Kayane, Ibaraki; Hirokazu Sawamoto, Minoo; Takashi Omura, Ashiya; Naoki Harada, Suita, all of Japan

[73] Assignee: Sumitomo Chemical Company, Limited, Osaka, Japan

[21] Appl. No.: 742,309

[22] Filed: Jun. 7, 1985

[30] Foreign Application Priority Data

Jun. 14, 1984 [JP]   Japan ................................ 59-122335

[51] Int. Cl.$^4$ .................. C09B 62/453; C09B 62/533; D06P 1/384; D06P 3/66
[52] U.S. Cl. .................................... 534/642; 534/582; 534/598; 534/617; 534/832; 534/833; 534/840; 534/860; 534/875; 534/876; 534/887; 534/637
[58] Field of Search ................ 534/637, 797, 642, 617

[56] References Cited

U.S. PATENT DOCUMENTS

| | | | |
|---|---|---|---|
| 2,722,527 | 11/1955 | Wehrli et al. ........................ | 534/797 |
| 3,261,825 | 7/1966 | Lesslie et al. ...................... | 534/797 X |
| 3,655,638 | 4/1972 | Ulrich et al. ....................... | 534/797 X |
| 4,083,840 | 4/1978 | Schoefberger ....................... | 534/797 |
| 4,329,282 | 5/1982 | Henk ................................ | 534/637 |
| 4,378,313 | 3/1983 | Kayane et al. ....................... | 534/638 |
| 4,412,948 | 11/1983 | Omura et al. ....................... | 534/637 |

FOREIGN PATENT DOCUMENTS

| | | | |
|---|---|---|---|
| 0042108 | 12/1981 | European Pat. Off. ............. | 534/637 |
| 3300373 | 7/1984 | Fed. Rep. of Germany ...... | 534/637 |
| 58-204052 | 11/1983 | Japan ............................... | 534/637 |
| 2026527 | 2/1980 | United Kingdom .............. | 534/637 |

Primary Examiner—Floyd D. Higel
Attorney, Agent, or Firm—Stevens, Davis, Miller & Mosher

[57] ABSTRACT

A compound, or a salt thereof, represented by the following formula,

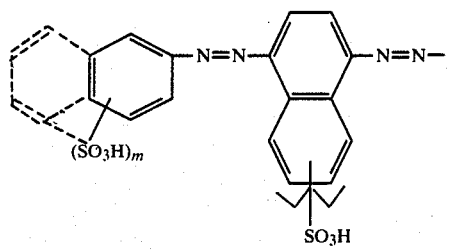

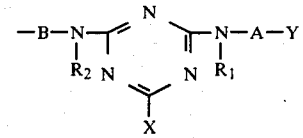

wherein A is a substituted or unsubstituted phenylene or naphthylene group, B is

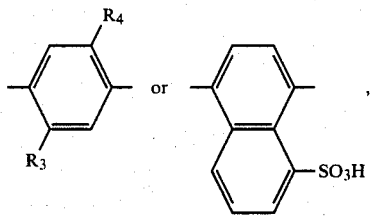

in which $R_3$ is a hydrogen atom or a lower alkyl, lower alkoxy, acylamino or ureido group, and $R_4$ is a hydrogen atom or a lower alkyl or lower alkoxy group, $R_1$ and $R_3$ are independently a hydrogen atom or a substituted or unsubstituted lower alkyl group, X is a substituted or unsubstituted amino, lower alkoxy, substituted phenoxy or sulfo group, Y is $-SO_2CH=CH_2$ or $-SO_2CH_2CH_2Z$, in which Z is a group capable of being split by the action of an alkali, and m is 2 or 3, which is useful for dyeing hydroxyl group- or amide group-containing fiber materials to give dyed products of a brown color having excellent fastness properties with good build-up property.

5 Claims, No Drawings

FIBER-REACTIVE DISAZO BROWN DYE HAVING VINYLSULFONE-TYPE REACTIVE GROUP

The present invention relates to a novel fiber-reactive compound, a method for producing the same, and a method for dyeing fiber materials using the same.

More specifically, the invention relates to a disazo compound useful for dyeing fiber materials in a brown color, a method for producing the same, and a method for dyeing hydroxyl group- or amide group-containing fiber materials using the same.

Fiber-reactice dyes having a monohalotriazinyl group or a sulfatoethylsulfonyl group or the like which is so-called vinylsulfone type group as a fiber-reactive group are known. Recently, reactive dyes having such two fiber-reactive groups in one molecule have been developed to improve dye performances of the reactive dyes having any one of the two reactive groups. However, reactive dyes of this kind are not always sufficient in dye performances.

Generally speaking, in order to be commercialized, reactive dyes are required to be well-balanced in various dye performances, such as build-up, level dyeing and washing-off properties, solubility, exhaustion and fixing abilities, insusceptibility to changes in dyeing temperature and bath ratio, and storage stability, and moreover capable of giving dyed materials, which are excellent in various fastness properties and hard to change the color during fixing treatments or resin-finishing procedures.

The present inventors have undertaken extensive studies to find a brown reactive dye meeting such requirements, and found a novel disazo compound consisting of a specific disazo dye moiety and a fiber-reactive group portion.

The present invention provides a compound, or a salt thereof, represented by the following formula (I),

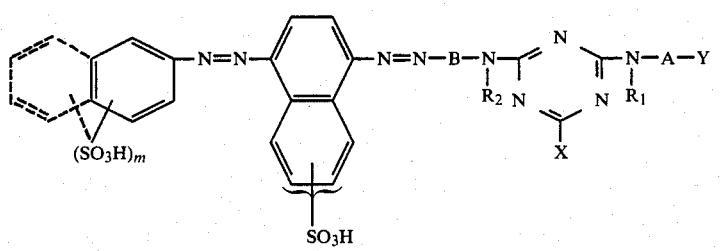

wherein A is a substituted or unsubstituted phenylene or naphthylene group, B is

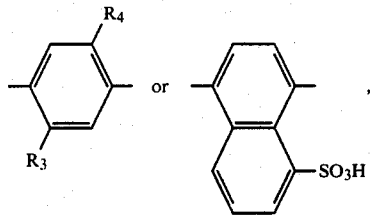

in which $R_3$ is a hydrogen atom or a lower alkyl, lower alkoxy, acylamino or ureido group, and $R_4$ is a hydrogen atom or a lower alkyl or lower alkoxy group, $R_1$ and $R_2$ are independently a hydrogen atom or a substituted or unsubstituted lower alkyl group, X is a substituted or unsubstituted amino, lower alkoxy, substituted phenoxy or sulfo group, Y is $-SO_2CH=CH_2$ or $-SO_2CH_2CH_2Z$, in which Z is a group capable of being split by the action of an alkali, and m is 2 or 3, and a method for producing the compound of the formula (I), which comprises (1) subjecting any one of a disazo dye compound of the following formula (VI),

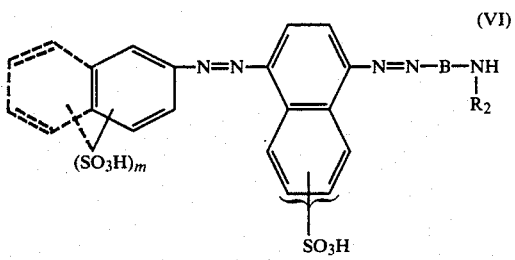

wherein B, $R_2$ and m are as defined above, or a substituted aromatic amine of the following formula (VII),

wherein A, $R_1$ and Y are as defined above, to first condensation with a cyanuric chloride or fluoride, followed by second condensation with the remainder to obtain a compound of the following formula (VIII),

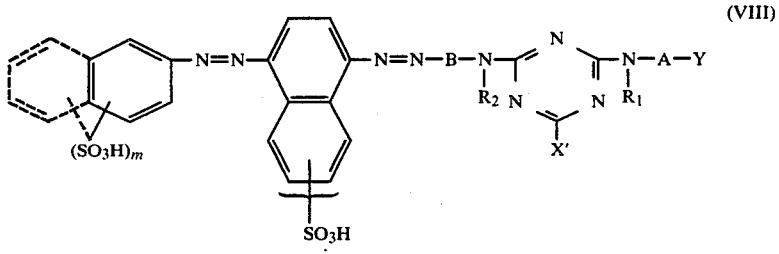

wherein A, B, $R_1$, $R_2$, Y and m are as defined above, and X' is a chlorine or fluorine atom, and reacting the compound (VIII) with a compound of the following formula (IX), $$X\text{---}H \qquad (IX)$$

wherein X is as defined above, or (2) subjecting any one of the disazo dye compound (VI) or the compound (IX) to first condensation with a cyanuric chloride or fluoride, followed by second condensation with the remainder, and reacting the resulting condensation product with the substituted aromatic amine (VII), the disazo dye compound being prepared by coupling a diazonium salt of an amine compound of the following formula (II),

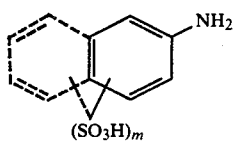

wherein m is as defined above, with an aminonaphthalenesulfonic acid of the following formula (III),

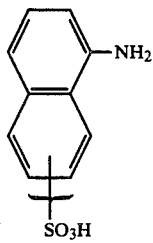

wherein the sulfo group is located at 6- or 7-position of the aminonaphthalene to obtain a monoazo compound of the following formula (IV)

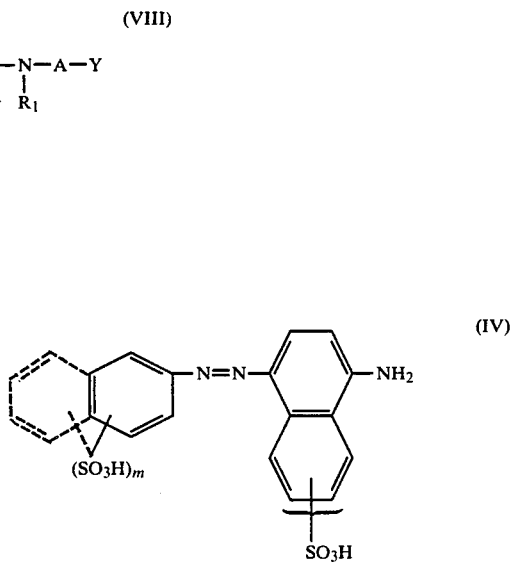

wherein m is as defined above, diazotizing the monoazo compound (IV), and coupling the resulting diazonium salt with an aromatic amine compound of the following formula (V), $$\begin{array}{c} R_2 \\ | \\ H\text{---}B\text{---}NH \end{array} \qquad (V)$$

wherein B and $R_2$ are as defined above.

The present invention also provides a method for dyeing hydroxyl group- or amide group-containing fiber materials using the compound (I).

Among the compounds, or salts thereof, represented by the formula (I), preferred are:

A compound, or a salt thereof, represented by the following formula,

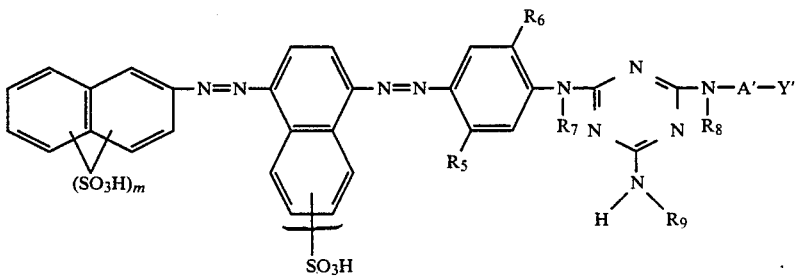

wherein m is as defined above, $R_5$ is a methyl, methoxy, acetylamino or ureido group, $R_6$ is a hydrogen atom or a methyl, ethyl or methoxy group, $R_7$ and $R_8$ are independently a hydrogen atom or a methyl or ethyl group, $R_9$ is a hydrogen atom or an ethyl, phenyl or naphthyl group, which group is unsubstituted or substituted with one or two sulfo groups, A' is a phenylene group which is unsubstituted or substituted with a methyl and/or methoxy group(s), or a naphthylene group which is unsubstituted or substituted with a sulfo group, and Y' is a β-sulfatoethylsulfonyl or vinylsulfonyl group;

A compound, or a salt thereof, represented by the following formula,

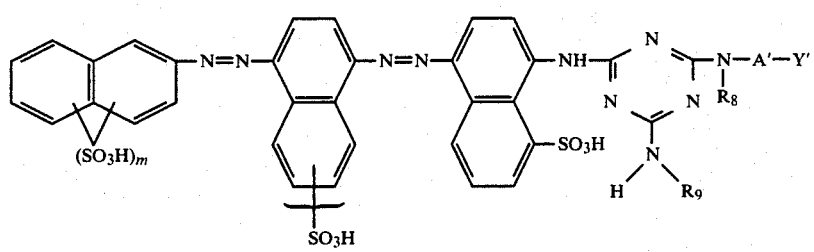

wherein R₈, R₉, A', Y' and m are as defined above;
And a compound, or a salt thereof, represented by the following formula,

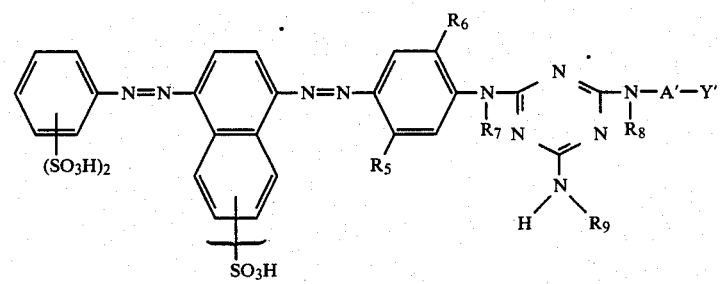

wherein R₅, R₆, R₇, R₈, R₉, A' and Y' are as defined above.

More specifically, preferred are compounds or salts thereof, represented by the following formulae,

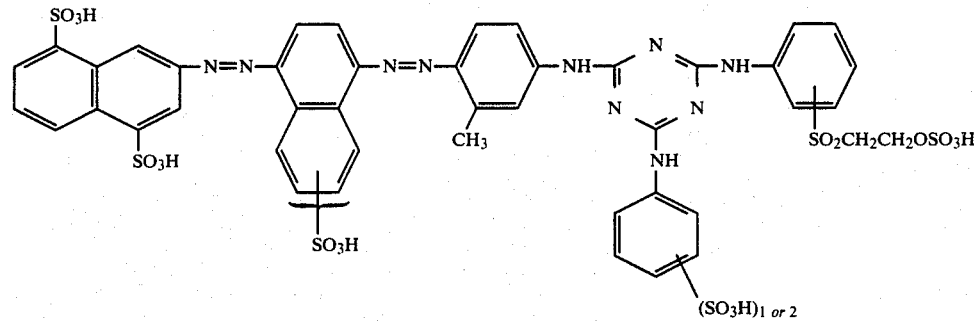

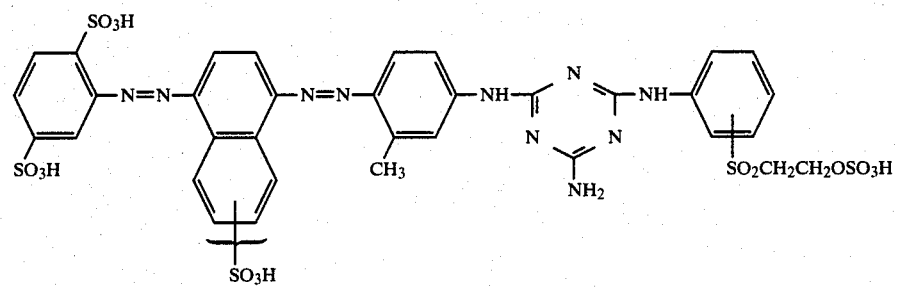

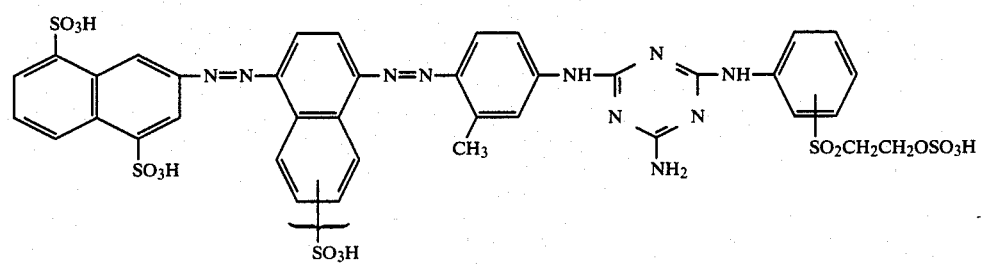

These compounds in accordance with the present invention may be in the form of a free acid or a salt of metals such as alkali metals and alkaline earth metals. Of these, preferred is a sodium or potassium salt.

The group Z capable of being split by the action of an alkali includes, for example, a sulfuric acid ester, thiosulfuric acid ester, phosphoric acid ester or acetic acid ester group, or a halogen atom.

In the above formula (I), preferred A includes phenyl group unsubstituted or substituted with one or two members selected from chlorine and bromine atoms and methyl, ethyl, methoxy, ethoxy and sulfonic acid groups, and a naphthylene group unsubstituted or substituted with one sulfonic acid group. Examples thereof are as follows.

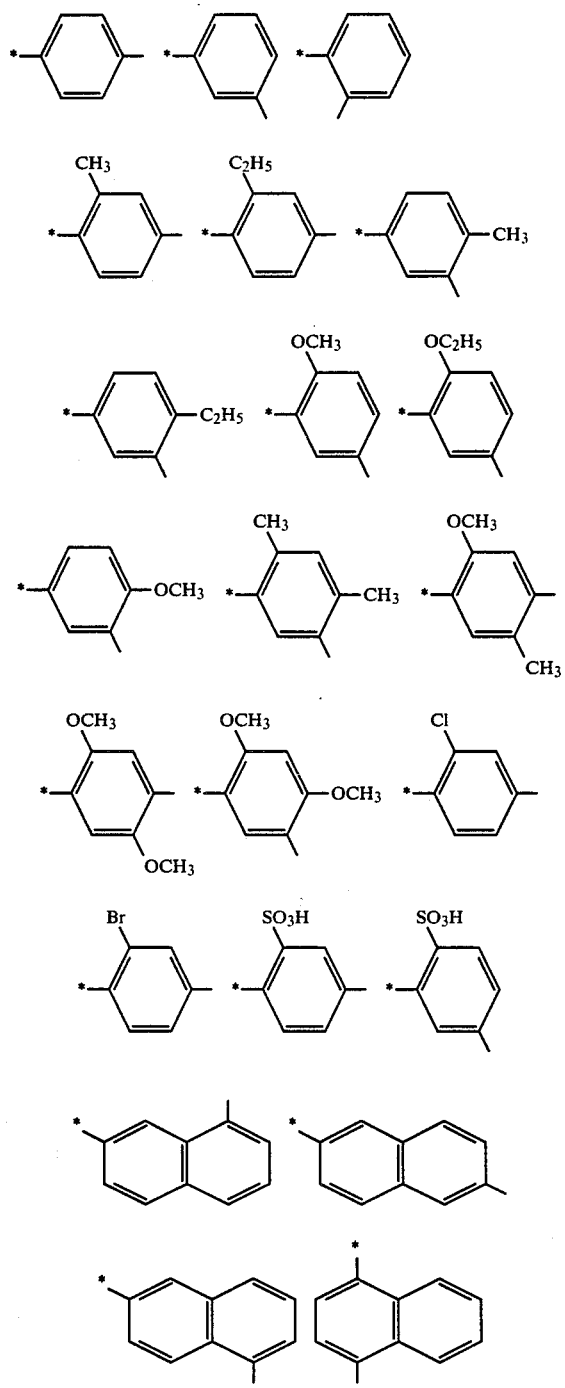

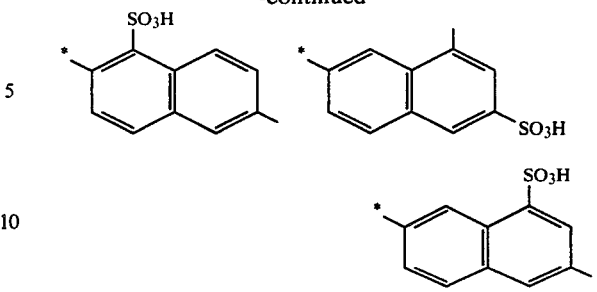

(In the above formulae, the asterisked linkage is bonded to the group,

)

With respect to the unsubstituted or substituted alkyl group represented by $R_1$ or $R_2$, the alkyl is preferably the one having 1 to 4 carbon atoms, and the substituent includes, for example, a halogen atom and a hydroxyl, cyano, alkoxy, carboxy, carbamoyl, alkoxycarbonyl, alkylcarbonyloxy, sulfo or sulfamoyl group. Examples of preferred $R_1$ or $R_2$ are hydrogen, methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl, and the like. Of these, particularly preferred are hydrogen, methyl and ethyl.

In the production of the compound of the formula (I), the amine compound of the formula (II) can be diazotized in a conventional manner.

The coupling reaction between the diazonium salt of the amine compound (II) and the aminonaphthalenesulfonic acid of the formula (III) can be carried out in an aqueous medium at a temperature of 0° to 40° C., preferably 0° to 20° C. at a pH of 2 to 9, preferably 3 to 7.

The resulting monoazo compound of the formula (IV) can be diazotized in a conventional manner.

The coupling reaction between the diazonium salt of the monoazo compound (IV) with the aromatic amine compound of the formula (V) can be carried out in an aqueous medium at a temperature of 0° to 40° C., preferably 0° to 20° C. at a pH of 2 to 9, preferably 3 to 7.

Successively, any one of the resulting disazo dye compound of the formula (VI) or the substituted aromatic amine of the formula (VII) is subjected to first condensation with cyanuric chloride or cyanuric fluoride, and then the remainder is subjected to second condensation with the first condensation product, thereby obtaining the compound of the formula (VIII). The first condensation reaction can be carried out in an aqueous medium at a temperature of −10° to 40° C., preferably 0° to 20° C., at a pH of 2 to 9, preferably 4 to 7, and the second condensation at a temperature of 10° to 70° C., preferably 20° to 50° C., at a pH of 2 to 9, preferably 4 to 7.

The condensation reaction between the compound (VIII) and the compound of the formula (IX) can be carried out in an aqueous medium at a temperature of 50° to 100° C., preferably 70° to 100° C., at a pH of 2 to 9, preferably 4 to 7, whereby the desired compound (I) can be obtained.

Alternatively, any one of the disazo dye compound (VI) or the compound (IX) is subjected to first condensation with cyanuric chloride or cyanuric fluoride, and the remainder is subjected to second condensation with the first condensation product. The first condensation can be carried out in an aqueous medium at a temperature of −10° to 40° C., preferably 0° to 20° C., at a pH of 2 to 9, preferably 4 to 7, and the second condensation at a temperature of 10° to 70° C., preferably 20° to 50° C., at a pH of 2 to 10, preferably 4 to 9. Successively, the resulting condensation product is subjected to reaction with the substituted aromatic amine (VII) at a temperature of 50° to 100° C., preferably 80° to 100° C., at a pH of 2 to 9, preferably 4 to 7, whereby the desired compound (I) can also be obtained.

Examples of the amine compound (II) are as follows:
Aniline-2,4-disulfonic acid
Aniline-2,5-disulfonic acid
2-Aminonaphthalene-4,8-disulfonic acid
2-Aminonaphthalene-3,6-disulfonic acid
2-Aminonaphthalene-6,8-disulfonic acid
2-Aminonaphthalene-3,7-disulfonic acid
2-Aminonaphthalene-4,7-disulfonic acid
2-Aminonaphthalene-5,7-disulfonic acid
2-Aminonaphthalene-1,5-disulfonic acid
2-Aminonaphthalene-1,7-disulfonic acid
2 Aminonaphthalene-4,6,8-trisulfonic acid
2-Aminonaphthalene-3,6,8-trisulfonic acid
2-Aminonaphthalene-1,5,7-trisulfonic acid.

Of these, aniline-2,4-disulfonic acid, aniline-2,5-disulfonic acid, 2-aminonaphthalene-4,8-disulfonic acid and 2-aminonaphthalene-4,6,8-trisulfonic acid are particularly preferred.

Examples of the aminonaphthalenesulfonic acid (III) are 1-aminonaphthalene-6-sulfonic acid and 1-aminonaphthalene-7-sulfonic acid.

Examples of the aromatic amine compound (V) are as follows:
Aniline
o-Toluidine
m-Toluidine
m-Ethylaniline
2,5-Dimethylaniline
2,5-Diethylaniline
o-Methoxyaniline
o-Ethoxyaniline
m-Methoxyaniline
m-Ethoxyaniline
2,5-Dimethoxyaniline
2-Methoxy-5-methylaniline
2-Ethoxy-5-methylaniline
m-Acetylaminoaniline
m-Propionylaminoaniline
m-Butylylaminoaniline
m-Benzoylaminoaniline
m-Hydroxyacetylaminoaniline
2-Methyl-5-acetylaminoaniline
2-Methoxy-5-acetylaminoaniline
2-Ethoxy-5-acetylaminoaniline
m-Ureidoaniline
1-Aminonaphthalene-8-sulfonic acid These aromatic amine compounds include their N-alkyl, N-hydroxyalkyl, N-cyanoalkyl, N-alkoxyalkyl, N-halogenoalkyl, N-carboxyalkyl, N-sulfoalkyl compounds and the like. Of these, m-toluidine and 1-aminonaphthalene-8-sulfonic acid are particularly preferred.

The compound (IX) includes ammonia, sulfites, aromatic amines, aliphatic amines, lower alcohols and substituted phenols.

Examples of the aromatic amines are:
1-Aminobenzene
1-Amino-3- or 4-methylbenzene
1-Amino-3,4- or 3,5-dimethylbenzene
1-Amino-3- or 4-ethylbenzene
1-Amino-3- or 4-methoxybenzene
1-Amino-4-ethoxybenzene
1-Amino-3- or 4-(2-hydroxyethoxy)benzene
1-Amino-3- or 4-(2-methoxyethoxy)benzene
1-Amino-3- or 4-chlorobenzene
3- or 4-Aminophenylmethanesulfonic acid
3-Aminobenzenesulfonic acid
4-Aminobenzenesulfonic acid
5-Aminobenzene-1,3-disulfonic acid
4-Aminobenzene-1,2-disulfonic acid
4-Amino-5-methylbenzene-1,2-disulfonic acid
3 or 4-Aminobenzenesulfonamide
3- or 4-Aminobenzenesulfonic acid methylamide
3- or 4-Aminobenzenesulfonic acid dimethylamide
3- or 4-Aminobenzenesulfonic acid (2-hydroxyethyl)-amide
5-Aminobenzene-1,3-dicarboxylic acid
3- or 4-Aminobenzoic acid
3- or 4-Aminobenzamide
Methyl or ethyl 3- or 4-aminobenzoate
3- or 4-Aminobenzonitrile
3-Amino-(N-phenylsulfonyl)-benzenesulfonamide
3- or 4-Aminophenol
5-Amino-2-hydroxybenzenesulfonic acid
4-Amino-2-hydroxybenzenesulfonic acid
5-Amino-2-ethoxybenzenesulfonic acid
1-Acetylamino-3- or 4-aminobenzene
1-Amino-3- or 4-(hydroxyacetyl)-aminobenzene
1-Amino-4-(sulfoacetyl)-aminobenzene
3- or 4-Aminophenylurea
N-(3-Aminophenyl)-N'-(2-hydroxyethyl)-urea
3- or 4-Aminophenyloxamic acid
N-Methylaminobenzene
N-Ethylaminobenzene
1-Methylamino-3- or 4-methylbenzene
1-Ethylamino-4-chlorobenzene
1-Ethylamino-3- or 4-methylbenzene
1-(2-Hydroxyethyl)-amino-3-methylbenzene
3- or 4-Methylaminobenzoic acid
3- or 4-Methylaminobenzenesulfonic acid
2-Aminonaphthalene-1-sulfonic acid
4-Aminonaphthalene-1-sulfonic acid 5-Aminonaphthalene-1-sulfonic acid
6-Aminonaphthalene-1-sulfonic acid
7-Aminonaphthalene 1-sulfonic acid
8-Aminonaphthalene-1-sulfonic acid
1-Aminonaphthalene-2-sulfonic acid
4-Aminonaphthalene-2-sulfonic acid
5-Aminonaphthalene-2-sulfonic acid
6-Aminonaphthalene-2-sulfonic acid
7-Aminonaphthalene-2-sulfonic acid
7-Methylaminonaphthalene-2-sulfonic acid
7-Ethylaminonaphthalene-2-sulfonic acid
7-Butylaminonaphthalene-2-sulfonic acid
7-Isobutylaminonaphthalene-2-sulfonic acid
8-Aminonaphthalene-2-sulfonic acid
4-Aminonaphthalene-1,3-disulfonic acid
5-Aminonaphthalene-1,3-disulfonic acid
6-Aminonaphthalene-1,3-disulfonic acid
7-Aminonaphthalene-1,3-disulfonic acid
8-Aminonaphthalene-1,3-disulfonic acid
2-Aminonaphthalene-1,5-dusulfonic acid
3-Aminonaphthalene-1,5-disulfonic acid
4-Aminonaphthalene-1,5-disulfonic acid
4-Aminonaphthalene-1,6-disulfonic acid
8-Aminonaphthalene-1,6-disulfonic acid
4-Aminonaphthalene-1,7-disulfonic acid
3-Aminonaphthalene-2,6-disulfonic acid
4-Aminonaphthalene-2,6-disulfonic acid
3-Aminonaphthalene-2,7-disulfonic acid
4-Aminonaphthalene 2,7-disulfonic acid
6-Aminonaphthalene-1,3,5-trisulfonic acid
7-Aminonaphthalene-1,3,5-trisulfonic acid
5-Aminonaphthalene-1,3,5-trisulfonic acid
4-Aminonaphthalene-1,3,6-trisulfonic acid
7-Aminonaphthalene-1,3,6-trisulfonic acid
8-Aminonaphthalene-1,3,6-trisulfonic acid
4-Aminonaphthalene-1,3,7-trisulfonic acid Examples of the aliphatic amines are:
Methylamine
Ethylamine
n-Propylamine
Isopropylamine
sec.-Butylamine
Dimethylamine
Diethylamine
Methylethylamine
Allylamin
2-Chloroethylamine
2-Methoxyethylamine
2-Aminoethanol
2-Methylaminoethanol
Bis-(2-hydroxyethyl)-amine
2-Acetylaminoethylamine
1-Amino-2-propanol
3-Methoxypropylamine
1-Amino-3-dimethylaminopropane
3-Methylaminopropionic acid nitrile
2-Aminoethanesulfonic acid
2-Methylaminoethanesulfonic acid
2-Sulfatoethylamine
Aminoacetic acid
Methylaminoacetic acid
ε-Aminocapronic acid
Benzylamine
2-, 3- or 4-Chlorobenzylamine
4-Methylbenzylamine
N-methylbenzylamine
2-, 3- or 4-Sulfobenzylamine
2-Phenylethylamine
1-Phenylethylamine
1-Phenyl-2-propylamine
Cyclohexylamine
N-Methylcyclohexylamine
N-(2-Hydroxyethyl)-cyclohexylamine
2-, 3- or 4-Methylcyclohexylamine
3,3,5-Trimethylcyclohexylamine
Morpholine
Piperidine
Pyrrolidine Examples of the lower alcohols are methanol, ethanol, n-propanol, isopropanol, n-butanol, isobutanol and the like.

Examples of the substituted phenols are 3- or 4-sulfophenol, 2,4- or 3,5-disulfophenol, 2-nitro-4-sulfophenol, 2-chloro-4-sulfophenol and the like.

The compound (I) produced in accordance with the present invention may be in a liquid form obtained by removing inorganic salts or adding a dyeing improver, if necessary, after completion of the reaction, or may be formed into a powdery product by subjecting the above liquid or the reaction mixture as such to evaporation i.e. spray-drying and the like, or into either liquid or powdery product through salting out of the desired compound in a conventional manner using an electrolyte.

The compound (I) of the present invention has a fiber-reactive group, and can be used for dyeing or printing hydroxyl group- or amide group-containing materials, which are preferably in a fibrous form. The fiber materials may be blended products.

The hydroxyl group-containing materials include natural or synthetic hydroxyl group-containing fiber materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the compound (I) by an exhaustion dyeing, padding or printing method.

The exhaustion dyeing can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for the dyeing, or prior thereto. Alternatively, the neutral salt may be added thereto dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogen carbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or overpadding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or a dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogen carbonate, sodium carbonate, sodium formate, potassium carbonate, sodium dihydrogen phosphate, disodium hydrogen phosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as a condensation product between cyanuric chloride and 3 times by mole of aminobenzensulfonic acid or aminonaphthalenesulfonic acid, or an addition product between stearylamine and ethylene oxide, and the like.

The present compound can be characterized by excellent dye performances in the dyeing or printing of fiber materials, particularly cellulose fiber materials. For example, the compound can give a dyed product excellent in light fastness, perspiration-light fastness, wet fastness such as chlorine resistance, washing resistance, peroxide-washing resistance perspiration resistance and acid-hydrolysis resistance, and alkali fastness, abrasion fastness and iron fastness. The compound can also exhibit excellent build-up, level-dyeing and wash-off properties, favorable solubility and high exhaustion and fixation percentages. Moreover, the compound can hardly be affected by changes in a dyeing temperature and a dyeing bath ratio, so that a dyed product with a constant quality can be given with superior reproducibility.

Moreover, there can be exhibited advantages such that the compound of the present invention is hard to be changed in the quality even when comes into contact with basic materials during storage, and the dyed product in accordance with the present invention is hard to be changed in color during the fix treatment or resin-finishing.

The present invention is illustrated in more detail with reference to the following Examples, which are only illustrative and not intended to limit the scope of the present invention. In Examples, part and % are by weight.

EXAMPLE 1

A mixture of 2-aminonaphthalene-4,8-disulfonic acid (9.1 parts) and concentrated hydrochloric acid (6.3 parts) in water (150 parts) was cooled to between 0° and 10° C., and a solution of sodium nitrite (2.1 parts) in water (4 parts) was added to the above mixture. After stirring the mixture for 1 hour at that temperature, 1-aminonaphthalene-6-sulfonic acid (6.7 parts) was added thereto, and then the pH was adjusted to between 6 and 7 by the addition of a 20% aqueous sodium carbonate solution. The resulting mixture was stirred for 2 hours at that temperature and at that pH.

Successively, the reaction mixture was adjusted to pH 8, and then mixed with sodium nitrite (2.5 parts). The resulting mixture was dropwise added to an 8% aqueous sulfuric acid (100 parts) over 1 hour, while keeping the temperature to between 10° and 15° C. The mixture was stirred for 3 hours at that temperature to perform diazotization. After excess nitrous acid was decomposed, m-toluidine (2.9 parts) was added thereto, and the mixture was stirred for 1 hour. Then, the pH was adjusted to between 5 and 6 by the dropwise addition of a 20% aqueous sodium carbonate solution taking over 1 hour, and the mixture was stirred for 3 hours at that pH.

To this reaction mixture, cyanuric chloride (5.5 parts) was added, and the mixture was stirred for 3 hours at a temperature of between 20° and 25° C., while controlling the pH within a range from 6 to 7 using a 20% aqueous sodium carbonate solution. Thereafter, sodium chloride (80 parts) was added to the reaction mixture to deposit crystals, which were separated on a suction filter.

The wet cake obtained was mixed with water (300 parts), and 3-aminobenzenesulfonic acid (5.2 parts) was added thereto. The mixture was heated to between 40° and 50° C., while controlling the pH within a range from 6 and 7 by the addition of a 20% aqueous sodium carbonate solution, and stirred for 4 hours at that temperature. Thereafter, sodium chloride (100 parts) was added to the reaction mixture to deposit crystals, which were separated on a suction filter.

The wet cake obtained was mixed with water (300 parts), and then 1-aminobenzene-3-β-sulfatoethylsulfone (8.4 parts) was added thereto. The mixture was heated to between 80° and 90° C., while controlling the pH within a range from 4 to 5 by the addition of a 20% aqueous sodium carbonate solution, and stirred for 12 hours at that temperature. Thereafter, the reaction mixture was cooled to 40° C., and mixed with sodium chloride (100 parts) to deposit crystals, which were separated on a suction filter, washed and then dried at 60° C. to obtain a disazo compound having the following formula.

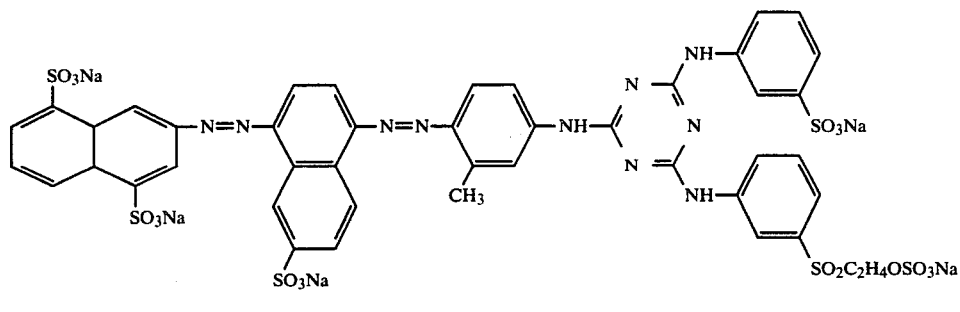

(λ max 477 nm)

EXAMPLES 2 to 33

Example 1 was repeated, provided that 2-aminonaphthalene-4,8-disulfonic acid, 1-aminonaphthalene-6-sulfonic acid, m-toluidine, 3-aminobenzenesulfonic acid, and 1-aminobenzene-3-β-sulfatoethylsulfone which were all used in Example 1 were replaced by those which are represented by the formulae (II), (III), (V), (IX) and (VII), respectively, thereby obtaining corresponding disazo compounds characterized by the color on cotton as shown in the following table.

| Example No. | Formula (II) | Formula (III) | Formula (V) | Formula (IX) | Formula (VII) | Color on cotton |
|---|---|---|---|---|---|---|
| 2 | 2-amino-naphthalene-1,5-disulfonic acid (NH₂ with SO₃H at 1 and 5) | 1-amino-naphthalene-7-sulfonic acid (8-NH₂, 2-SO₃H) | m-toluidine (3-CH₃ aniline) | 4-aminobenzenesulfonic acid (sulfanilic acid) | 3-amino-phenyl-β-sulfatoethylsulfone (H₂N-C₆H₄-SO₂C₂H₄OSO₃H, meta) | Brown |
| 3 | " | " | " | 3-aminobenzenesulfonic acid (NH₂, SO₃H meta) | 4-amino-phenyl-β-sulfatoethylsulfone (H₂N-C₆H₄-SO₂C₂H₄OSO₃H, para) | " |
| 4 | " | 1-amino-naphthalene-6-sulfonic acid (5-NH₂, 2-SO₃H on naphthalene — actually drawn as NH₂ at 1, SO₃H at 6) | " | 2-amino-benzene-1,4-disulfonic acid (NH₂, SO₃H at 1,4) | 4-amino-2-methoxyphenyl-β-sulfatoethylsulfone (H₂N-C₆H₃(OCH₃)-SO₂C₂H₄OSO₃H) | " |
| 5 | " | " | " | 2-amino-benzene-1,4-disulfonic acid (NH₂ at 2, SO₃H at 1 and 4) | 4-amino-phenyl-vinylsulfone (H₂N-C₆H₄-SO₂CH=CH₂) | " |

| Example No. | Formula (II) | Formula (III) | Formula (V) | Formula (IX) | Formula (VII) | Color on cotton |
|---|---|---|---|---|---|---|
| 6 | 2,5-disulfo aniline (SO₃H, NH₂, SO₃H on benzene) | 8-amino-naphthalene-2-sulfonic acid (NH₂, SO₃H) | 3-methyl aniline (NH₂, CH₃) | 3-amino benzenesulfonic acid (NH₂, SO₃H) | 3-amino-phenyl-β-sulfatoethylsulfone (H₂N—C₆H₄—SO₂C₂H₄OSO₃H) | Yellowish brown |
| 7 | " | 6-amino-naphthalene-2-sulfonic acid (NH₂, SO₃H) | " | " | " | Yellowish brown |
| 8 | 4-amino-3-sulfo benzenesulfonic acid (SO₃H, NH₂, HO₃S) | " | 3-acetylamino aniline (NH₂, NHCOCH₃) | " | 4-amino-phenyl-β-sulfatoethylsulfone (H₂N—C₆H₄—SO₂C₂H₄OSO₃H) | Yellowish brown |
| 9 | " | 8-amino-naphthalene-2-sulfonic acid (NH₂, SO₃H) | 3-ureido aniline (NH₂, NHCONH₃) | 4-amino benzenesulfonic acid (NH₂, HO₃S) | 4-amino-2-(β-sulfatoethylsulfonyl)-anisole (OCH₃, SO₂C₂H₄OSO₃H, H₂N) | Yellowish brown |

-continued

| Example No. | Formula (II) | Formula (III) | Formula (V) | Formula (IX) | Formula (VII) | Color on cotton |
|---|---|---|---|---|---|---|
| 10 | 2-amino-naphthalene-1,5-disulfonic acid (NH₂, SO₃H, SO₃H) | 1-amino-naphthalene-7-sulfonic acid (NH₂, SO₃H) | m-toluidine (NH₂, CH₃) | p-anisidine (NH₂, OCH₃) | 4-(β-sulfatoethylsulfonyl)aniline (H₂N–C₆H₄–SO₂C₂H₄SSO₃H) | Brown |
| 11 | " | " | 3-amino-4-methoxy (NH₂, OCH₃) | 4-acetamido aniline (CH₃CONH, NH₂) | 3-(β-sulfatoethylsulfonyl)aniline (H₂N–C₆H₄–SO₂C₂H₄OSO₃H) | " |
| 12 | " | " | N-methyl-m-toluidine (CH₃–NH, CH₃) | metanilic acid (NH₂, SO₃H) | " | Yellowish brown |
| 13 | " | " | N-ethyl-m-toluidine (C₂H₅–NH, CH₃) | N-methylaniline (CH₃–NH) | " | Yellowish brown |
| 14 | " | 1-amino-naphthalene-6-sulfonic acid (NH₂, SO₃H) | m-toluidine (NH₂, CH₃) | m-toluidine (NH₂, CH₃) | 4-amino-2-(β-sulfatoethylsulfonyl)anisole (H₂N, OCH₃, SO₂C₂H₄OSO₃H) | Brown |

-continued
| Example No. | Formula (II) | Formula (III) | Formula (V) | Formula (IX) | Formula (VII) | Color on cotton |
|---|---|---|---|---|---|---|
| 15 | " | " | 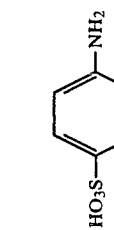 | 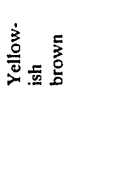 | 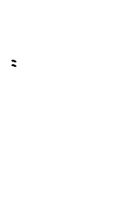 | " |
| 16 | " | " | 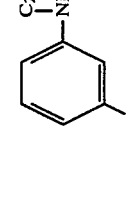 | 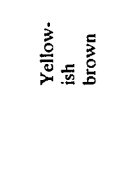 | " | Yellowish brown |
| 17 | " | " | 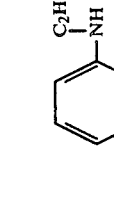 | 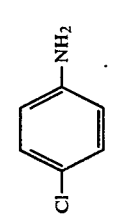 | " | Yellowish brown |
| 18 | " | 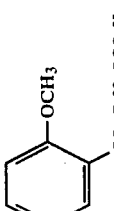 |  | | " | Brown |
| 19 | " | " | " | | | " |

-continued
| Example No. | Formula (II) | Formula (III) | Formula (V) | Formula (IX) | Formula (VII) | Color on cotton |
|---|---|---|---|---|---|---|
| 20 | " | " | |  |  | " |
| 21 | " | " | |  |  | " |
| 22 | " | " | " |  |  | Brown |
| 23 | " | " |  |  | " | Reddish brown |
| 24 | " | " |  |  | (SO₂C₂H₄OSO₃H structure with H₂N-phenyl) | Reddish brown |
| 25 | " | " | (OCH₃, NH₂, CH₃ substituted benzene) | (naphthalene with NH₂, SO₃H groups) | (SO₂CH=CH₂ structure with H₂N-phenyl) | Brown |

-continued

| Example No. | Formula (II) | Formula (III) | Formula (V) | Formula (IX) | Formula (VII) | Color on cotton |
|---|---|---|---|---|---|---|
| 26 | " | 5-amino-naphthalene-2-sulfonic acid | 8-amino-naphthalene-1-sulfonic acid | 3-aminobenzenesulfonic acid | 3-amino-phenyl-SO₂C₂H₄OSO₃H | Bordeaux |
| 27 | " | 8-amino-1,2-dihydronaphthalene-2-sulfonic acid | " | 4-aminobenzenesulfonic acid (sulfanilic acid) | 4-amino-2-methylphenyl-SO₂C₂H₄OSO₃H | " |
| 28 | " | " | " | 6-amino-naphthalene-2-sulfonic acid | 4-amino-3-methoxyphenyl-SO₂C₂H₄OSO₃H | " |
| 29 | " | " | " | 3-amino-naphthalene-1,5-disulfonic acid | 4-amino-2-chlorophenyl-SO₂C₂H₄OSO₃H | " |

-continued

| Example No. | Formula (II) | Formula (III) | Formula (V) | Formula (IX) | Formula (VII) | Color on cotton |
|---|---|---|---|---|---|---|
| 30 | 7-amino-naphthalene-1,3-disulfonic acid | 8-amino-naphthalene-2-sulfonic acid | 3-amino-toluene (m-toluidine) | 3-amino-benzenesulfonic acid | 3-amino-phenyl-SO$_2$C$_2$H$_4$OSO$_3$H | Brown |
| 31 | " | " | " | 6-amino-naphthalene-2-sulfonic acid | 4-amino-phenyl-SO$_2$C$_2$H$_4$OSO$_3$H | " |
| 32 | 3-amino-naphthalene-2,6-disulfonic acid | " | " | 3-amino-benzenesulfonic acid | 4-amino-phenyl-SO$_2$C$_2$H$_4$OCOCH$_3$ | " |
| 33 | " | " | " | 6-amino-naphthalene-2-sulfonic acid | 6-amino-naphthalene-2-SO$_2$C$_2$H$_4$OSO$_3$H | " |

EXAMPLE 34

The disazo compound obtained in Example 1 (0.1, 0.3 and 0.6 part) was respectively dissolved in water (200 parts), and sodium sulfate (10 parts) and cotton (10 parts) were added thereto. The bath was heated to 60° C., and then sodium carbonate (4 parts) was added thereto. Dyeing was continued for 1 hour at that temperature. The dyed cotton was washed with water, soaped, washed with water and then dried. Thus, a dyed product of a brown color having excellent fastness properties, particularly chlorine fastness, light fastness and perspiration-light fastness was obtained with good build-up property.

The disazo compound used was also found to have a good solubility and to exhibit excellent level dyeing property with good reproducibility.

EXAMPLE 35

The disazo compound obtained in Example 18 (0.3 part) was dissolved in water (150 parts), and sodium sulfate (10 parts) and cotton (10 parts) were added thereto. The bath was heated to 70° C., and 30 minutes thereafter, sodium carbonate (3 parts) was added to the bath. Dyeing was continued for 1 hour at that temperature. Thereafter, the dyed cotton was washed with water, soaped, washed with water and then dried. A dyed product of a brown color having excellent fastness properties, particularly chlorine fastness, light fastness and perspiration-light fastness, was obtained with good build-up property.

EXAMPLE 36

A mixture of 2-aminonaphthalene-4,8-disulfonic acid (9.1 parts) and concentrated hydrochloric acid (6.3 parts) in water (150 parts) was cooled to a temperature of between 0° and 10° C., and a solution of sodium nitrite (2.1 parts) in water (4 parts) was introduced thereinto. The mixture was stirred for 1 hour at that temperature. Then, 1-aminonaphthalene-7-sulfonic acid (6.7 parts) was added to the above diazonium liquor, and the mixture was controlled to a pH of between 6 and 7, and stirred for 2 hours at that temperature and pH. Successively, the mixture was adjusted to pH 8, and mixed with sodium nitrite (2.5 parts). The resulting mixture was dropwise added to an 8% aqueous sulfuric acid (100 parts) over 1 hour, while controlling to a temperature of between 10° and 15° C., and the mixture was stirred for 3 hours at that temperature to complete the diazotization. After decomposing an excess nitrous acid, m-toluidine (2.9 parts) was added thereto, and the mixture was stirred for 1 hour, adjusted to a pH of between 5 and 6 taking over 1 hour, and thereafter stirred for 3 hours at that pH. To this reaction was added cyanuric chloride (5.5 parts), and the mixture was stirred for 3 hours at a temperature of between 20° and 25° C., while controlling to a pH of between 6 and 7 using a 20% aqueous sodium carbonate solution. Thereafter, sodium chloride (80 parts) was added thereto to precipitate crystals, which were then collected on a suction filter. The wet cake obtained was mixed with water (300 parts), and stirred for 3 horus at a temperature of between 20° and 30° C., while controlling to a pH of between 9 and 10 using a 10% aqueous ammonia solution. Sodium chloride (100 parts) was added thereto to precipitate crystals, which were then collected on a suction filter. The wet cake obtained was mixed with water (300 parts), and 1-aminobenzene-3-$\beta$-sulfatoethylsulfone (8.4 parts) was added thereto. The mixture was heated to a temperature of between 80° and 90° C., while controlling to a pH of between 4 and 5 using a 20% aqueous sodium carbonate solution, stirred for 20 hours at that temperature, and then cooled to 40° C. Sodium chloride (100 parts) was added thereto to precipitate crystals. The crystals were collected on a suction filter, washed and then dried at 60° C., thereby obtaining a disazo compound having the following formula.

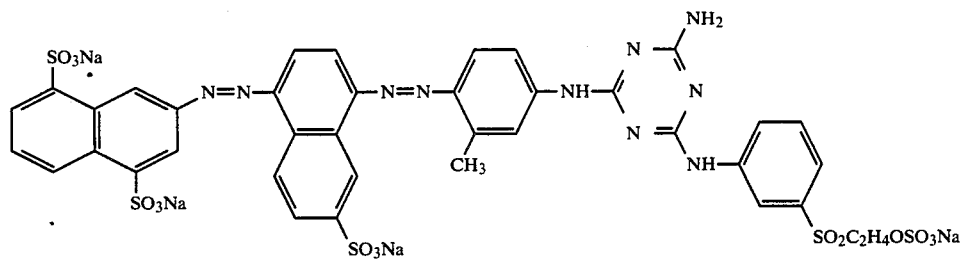

($\lambda$ max 480 nm)

EXAMPLES 37 TO 52

Example 36 was repeated, provided that 2-aminonaphthalene-4,8-disulfonic acid, 1-aminonaphthalene-7-sulfonic acid, m-toluidine, ammonia and 1-aminobenzene3-$\beta$-sulfatoethylsulfone were replaced by each compound represented by the formulae (II), (III), (V), (IX) and (VII) as shown in the following table, respectively, thereby obtaining each corresponding disazo compound.

| Example No. | Formula (II) | Formula (III) | Formula (V) | Formula (IX) | Formula (VII) | Color on cotton |
|---|---|---|---|---|---|---|
| 37 | SO$_3$H — NH$_2$, SO$_3$H | NH$_2$, SO$_3$H | NH$_2$, CH$_3$ | NH$_3$ | H$_2$N—⟨⟩—SO$_2$C$_2$H$_2$OSO$_3$H | Brown |

-continued

| Example No. | Formula (II) | Formula (III) | Formula (V) | Formula (IX) | Formula (VII) | Color on cotton |
|---|---|---|---|---|---|---|
| 38 | " | " | " | " | 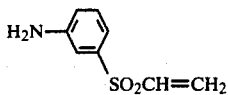 H$_2$N—⌬—SO$_2$CH=CH$_2$ | " |
| 39 | | 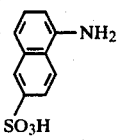 6-amino-2-naphthalenesulfonic acid | " | " | 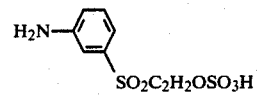 H$_2$N—⌬—SO$_2$C$_2$H$_2$OSO$_3$H | " |
| 40 | " | " | " | " | 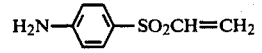 H$_2$N—⌬—SO$_2$CH=CH$_2$ | " |
| 41 | 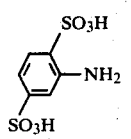 2,5-disulfoaniline | 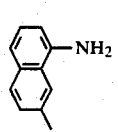 | " | " | 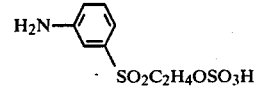 H$_2$N—⌬—SO$_2$C$_2$H$_4$OSO$_3$H | " |
| 42 | 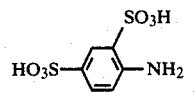 | " | " | " | 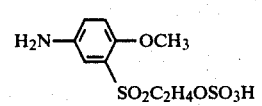 H$_2$N—⌬(OCH$_3$)—SO$_2$C$_2$H$_4$OSO$_3$H | " |
| 43 | 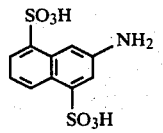 | " | 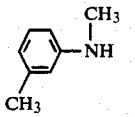 m-toluidine N-methyl | " | 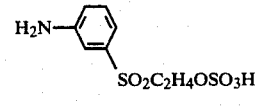 H$_2$N—⌬—SO$_2$C$_2$H$_4$OSO$_3$H | " |
| 44 | " | 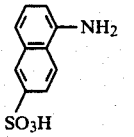 | 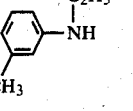 N-ethyl-m-toluidine | " | " | " |
| 45 | 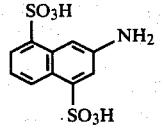 | 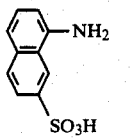 | 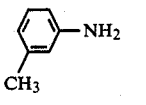 | H$_2$NCH$_2$CH$_2$SO$_3$H | " | " |
| 46 | " | " | " | " | 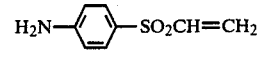 H$_2$N—⌬—SO$_2$CH=CH$_2$ | " |
| 47 | " | " | " | H$_2$NCH$_2$CH$_2$OH | 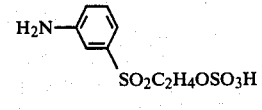 H$_2$N—⌬—SO$_2$C$_2$H$_4$OSO$_3$H | " |
| 48 | " | 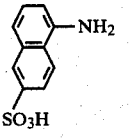 | 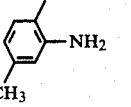 2,5-dimethylaniline | " | 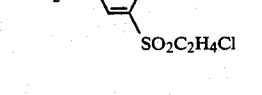 H$_2$N—⌬—SO$_2$C$_2$H$_4$Cl | " |
| 49 | 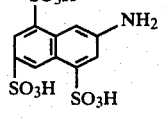 | 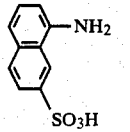 | 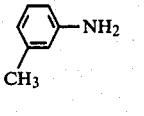 | C$_2$H$_5$NH$_2$ | 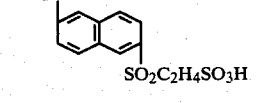 H$_2$N—naphthyl—SO$_2$C$_2$H$_4$SO$_3$H | " |

-continued

| Example No. | Formula (II) | Formula (III) | Formula (V) | Formula (IX) | Formula (VII) | Color on cotton |
|---|---|---|---|---|---|---|
| 50 | " | " | " | ⟨⟩—CH$_2$NH$_2$ | H$_2$N—⟨⟩—OCH$_3$ <br> SO$_2$C$_2$H$_4$OSO$_3$H | " |
| 51 | SO$_3$H, NH$_2$, SO$_3$H (naphthalene) | " | " | n-C$_3$H$_7$NH$_2$ | H$_2$N—⟨⟩—SO$_2$C$_2$H$_4$OSO$_3$H | " |
| 52 | " | " | " | H$_2$NCH$_2$CH$_2$OH | H$_2$N—⟨⟩—SO$_2$C$_2$H$_4$OPO$_3$H$_2$ | " |

EXAMPLE 53

The disazo compound obtained in Example 36 (0.1, 0.3 and 0.6 part) was respectively dissolved in water (200 parts). Sodium sulfate (10 parts) and cotton (10 parts) were added thereto, and the bath was heated to 60° C. Then, sodium carbonate (4 parts) was added to the bath, and dyeing was continued for 1 hour. The cotton was washed with water, soaped, washed with water and then dried to obtain each dyed product of a brown color having excellent fastness properties, particularly chlorine, light and perspiration light fastness with extremely favorable build-up property.

The compound was also found to have a good solubility and exhibit excellent level dyeing property with good reproducibility.

EXAMPLE 54

The disazo compound obtained in Example 39 (0.3 part) was dissolved in water (150 parts). Sodium sulfate (10 parts) and cotton (10 parts) were added thereto, and the bath was heated to 50° C. 30 Minutes thereafter, sodium carbonate (3 parts) was added to the bath, and dyeing was continued for 1 hour at that temperature. Thereafter, the cotton was washed with water and soaped to obtain a dyed product of brown color having excellent fastness properties, particularly chlorine, light and perspiration light fastness with good build-up property.

EXAMPLE 55

2-Aminonaphthalene-4,6,8-trisulfonic acid (11.5 parts) was dissolved in water (150 parts) by adjusting the pH to 8, and sodium nitrite (2.1 parts) was added thereto. The mixture was cooled to a temperature of between 0° and 5° C., and concentrated hydrochloric acid (12.5 parts) was added at a stroke. The resulting mixture was stirred for 1 hour at that temperature.

1-Aminonaphthalene-6-sulfonic acid (6.7 parts) was added to the above diazonium liquor, and the mixture was adjusted to a pH of between 6 and 7 using a 15% aqueous sodium carbonate solution, and stirred for 2 hours, while keeping the temperature and pH between 0° and 5° C., and between 6 and 7, respectively. The reaction mixture was then adjusted to pH 8, and mixed with sodium nitrite (2.5 Parts). To a 10% aqueous sulfuric acid (100 parts) was added the above mixture over 1 hour, while keeping the temperature within a range of 10° to 15° C., and the mixture was stirred further for 2 hours at that temperature. After excess nitrous acid therein was decomposed, m-toluidine (2.9 parts) was added, and the mixture was adjusted to a pH of between 5 and 7 over 1 hour using a 15% aqueous sodium carbonate solution, and stirred for additional 2 hours at that pH. To this reaction mixture, cyanuric chloride (5.5 parts) was added, and the mixture was stirred for 3 hours at a temperature of between 20° and 25° C., while controlling to a pH of between 6 and 7 using a 15% aqueous sodium carbonate solution. Sodium chloride (100 parts) was added thereto to deposit crystals, which were collected on a suction filter. The wet cake obtained was dissolved in water (300 parts), and 1-N-ethylaminobenzene-3-β-sulfatoethylsulfone (9.3 parts) was added to the solution. The mixture was heated to a temperature of between 40° and 50° C., while controlling to a pH of between 5 and 6 using a 15% aqueous sodium carbonate solution, and stirred for 6 hours at that temperature. Sodium chloride (80 parts) was added thereto to precipitate crystals, which were then collected on a suction filter. The wet cake obtained was dissolved in water (300 parts), and aniline (2.8 parts) was added to the solution. The resulting mixture was heated to a temperature of between 80° and 90° C., while controlling to a pH of between 4 and 5, stirred for 18 hours at that temperature, and then cooled to 40° C. Sodium chloride (90 parts) was added thereto to precipitate crystals, which were then collected on a suction filter, washed and then dried at 60° C., then obtaining a disazo compound of the following formula.

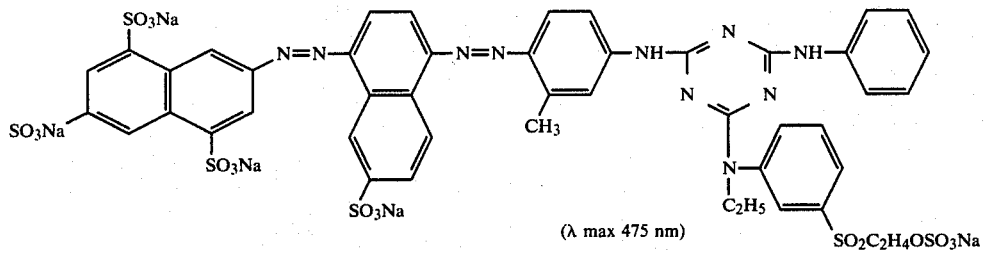

(λ max 475 nm)

EXAMPLES 56 to 63

Example 55 was repeated, provided that 2-aminonaphthalene-4,6,8-trisulfonic acid, 1-aminonaphthalene-6-sulfonic acid, m-toluidine, 1-N-ethylaminobenzene-3-β-sulfatoethylsulfone and aniline were replaced by each compound of the formulae (II), (III), (V), (IX) and (VII), respectively, thereby obtaining each corresponding disazo compound.

| Example No. | Formula (II) | Formula (III) | Formula (V) | Formula (IX) | Formula (VII) | Color on cotton |
|---|---|---|---|---|---|---|
| 56 | SO₃H, NH₂, SO₃H (naphthalene) | NH₂, SO₃H (naphthalene) | NH₂, CH₃ (benzene) | NH₂, SO₃H (benzene) | C₂H₅, HN—benzene—SO₂C₂H₄OSO₃H | Brown |
| 57 | " | NH₂, SO₃H (naphthalene, different isomer) | " | NH₂, SO₃H (naphthalene) | CH₃, HN—benzene—SO₂C₂H₄OSO₃H | " |
| 58 | " | " | C₂H₅, NH, CH₃ (benzene) | NH₂, SO₃H (benzene) | C₂H₄OH, HN—benzene—OCH₃, SO₂C₂H₄OSO₃H | " |
| 59 | SO₃H, NH₂, SO₃H, SO₃H (naphthalene) | " | CH₃, NH₂, CH₃ (benzene) | NH₂, Cl (benzene) | C₃H₇, HN—benzene—SO₂C₂H₄OSO₃H | " |
| 60 | SO₃H, NH₂, SO₃H (naphthalene) | NH₂, SO₃H (naphthalene) | NH₂, CH₃ (benzene) | HO₃S—benzene—NH₂ | C₂H₄CONH₂, HN—benzene—OCH₃, SO₂C₂H₄OSO₃H | " |
| 61 | " | " | " | NH₂, CH₃ (benzene) | C₂H₄COOH, HN—benzene—SO₂C₂H₄OSO₃H | " |
| 62 | NH₂, SO₃H, SO₃H (naphthalene) | " | NH₂, NHCOC₂H₅ (benzene) | CH₃O—benzene—NH₂ | C₂H₅, HN—benzene—SO₂C₂H₄OSO₃H | Reddish brown |

| Example No. | Formula (II) | Formula (III) | Formula (V) | Formula (IX) | Formula (VII) | Color on cotton |
|---|---|---|---|---|---|---|
| 63 | " | (naphthyl-NH₂, SO₃H) | (phenyl-NH₂, NHCONH₂) | (phenyl-NH₂, SO₃H) | C₂H₄COOH / HN—(phenyl)—SO₂C₂H₄OSO₃H | " |

EXAMPLE 64

A mixture of 2-aminonaphthalene-4,8-disulfonic acid (9.1 parts) and concentrated hydrochloric acid (6.3 parts) in water (150 parts) was cooled to a temperature of between 0° and 10° C., and mixed with a solution of sodium nitrite (2.1 parts) in water (4 parts), and the mixture was stirred for 1 hour at that temperature. 1-Aminonaphthalene-7-sulfonic acid (6.7 parts) was added to the above diazonium liquor. The mixture was adjusted to a pH of between 6 and 7 using a 20% aqueous sodium carbonate solution, and stirred for 2 hours at that temperature and that pH. Successively, the reaction mixture was adjusted to pH 8, and then mixed with sodium nitrite (2.5 parts). The resulting mixture was added dropwise over 1 hour to an 8% aqueous sulfuric acid (100 parts), while controlling to a temperature of between 10° and 15° C. Stirring was continued for 3 hours at that temperature to complete diazotization. After decomposing excess nitrous acid, 1-aminonaphthalene-8-sulfonic acid (6.7 parts) was added to the above diazonium liquor, and the mixture was adjusted to a pH of between 6 and 7, and stirred for 2 hours at that temperature. Cyanuric chloride (5.5 parts) was then added thereto, and the resulting mixture was stirred at a temperature of between 20° and 25° C. for 2 hours, during which the pH was controlled within a range from 6 to 7 using a 20% aqueous sodium carbonate solution. Sodium chloride (80 parts) was added thereto to deposit crystals, which were then collected on a suction filter. The wet cake obtained was dissolved in water (300 parts), and the solution was mixed with sodium sulfite (11.3 parts), followed by stirring for 4 hours at a temperature of between 25° and 35° C. Sodium chloride (60 parts) was added thereto to deposit crystals, which were then collected on a suction filter. The wet cake obtained was mixed with water (300 parts), and then 1-aminobenzene-3-β-sulfatoethylsulfone (8.4 parts) was added thereto. The resulting mixture was heated to a temperature of between 70° and 80° C., while controlling to a pH of between 4 and 5 using a 15% aqueous sodium carbonate solution, stirred for 4 hours at that temperature, and then cooled to 50° C. Sodium chloride (100 parts) was added to the reaction mixture to deposit crystals, which were then collected on a suction filter, washed and dried at 60° C., thereby obtaining a disazo compound of the following formula.

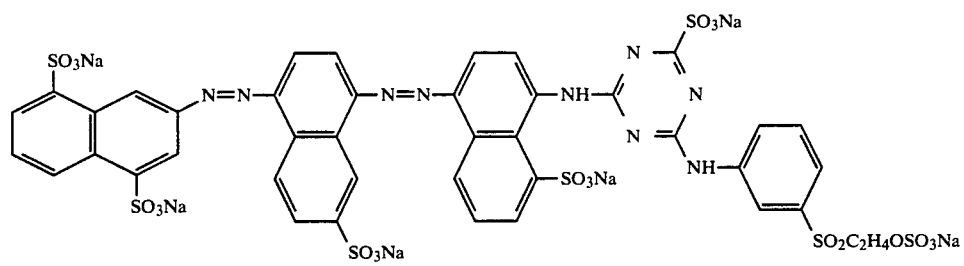

(λ max 492 nm)

EXAMPLE 65

A mixture of 2-aminonaphthalene-4,8-disulfonic acid (9.1 parts) and concentrated hydrochloric acid (6.3 parts) in water (150 parts) was cooled to a temperature of between 0° and 10° C., and then mixed with a solution of sodium nitrite (2.1 parts) in water (4 parts), and the mixture was stirred for 1 hour at that temperature. Successively, 1-aminonaphthalene-7-sulfonic acid (6.7 parts) was added thereto, and the mixture was adjusted to a pH of between 6 and 7 using a 20% aqueous sodium carbonate solution, and stirred for 2 hours at that temperature and that pH. The reaction mixture was adjusted to pH 8, and then mixed with sodium nitrite (2.5 parts), and the resulting mixture was added dropwise to an 8% aqueous sulfuric acid (100 parts) over 1 hour, during which the temperature was controlled within a range from 10° to 15° C. Stirring was continued for 3 hours at that temperature to complete diazotization. After decomposing excess nitrous acid, m-toluidine (2.9 parts) was added thereto, and the mixture was stirred for 1 hour, adjustd to a pH of between 5 and 6 over 1 hour using a 20% aqueous sodium carbonate solution, and stirred for additional 3 hours at that pH.

Into methanol (100 parts) were added water (10 parts), sodium hydrogen carbonate (2.5 parts) and then cyanuric chloride (5.5 parts), and the mixture was stirred for 30 minutes, while controlling to a temperature of between 0° and 10° C. The thus obtained reaction mixture was added to the above reaction mixture. The whole was stirred for 8 hours at a temperature of between 30° and 40° C., while controlling to a pH of between 6 and 7 using a 20% aqueous sodium carbonate solution. Thereafter, sodium chloride (80 parts) was added thereto to precipitate crystals, which were then collected on a suction filter. The wet cake obtained was mixed with water (300 parts), and 1-aminobenzene-3-β-sulfatoethylsulfone (8.4 parts) was added thereto. The resulting mixture was heated to a temperature of between 80° and 90° C., while controlling to a pH of between 4 and 5 using a 15% aqueous sodium carbonate solution, stirred for 15 hours at that temperature, and then cooled to 40° C. Sodium chloride (70 parts) was added thereto to precipitate crystals, which were then collected on a suction filter, washed and dried at 60° C., thereby obtaining a disazo compound of the following formula.

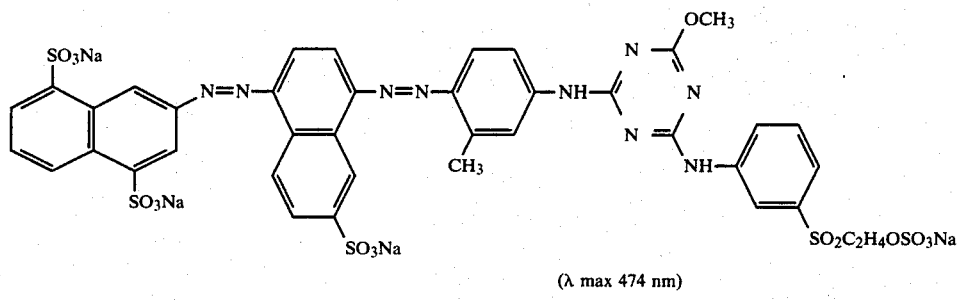

(λ max 474 nm)

EXAMPLE 66 to 73

Example 65 was repeated, provided that, 2-aminonaphthalene-4,8-disulfonic acid, 1-aminonaphthalene-7-sulfonic acid, m-toluidine, methanol and 1-aminobenzene-3-β-sulfatoethylsulfone were replaced by each compound of the formulae (II), (III), (V), (IX) and (VII) as shown in the following table, respectively, thereby obtaining each corresponding disazo compound.

| Example No. | Formula (II) | Formula (III) | Formula (V) | Formula (IX) | Formula (VII) | Color on cotton |
|---|---|---|---|---|---|---|
| 66 | naphthalene with SO₃H, SO₃H, NH₂ | naphthalene with NH₂, SO₃H | benzene with NH₂, CH₃ | CH₃OH | H₂N—C₆H₄—SO₂C₂H₄OSO₃H | Brown |
| 67 | " | " | benzene with N(C₂H₅)H, CH₃ | C₂H₅OH | H₂N—C₆H₃(CH₃)—SO₂C₂H₄OSO₃H | Yellowish brown |
| 68 | " | naphthalene with NH₂, SO₃H | benzene with NH₂, CH₃ | (CH₃)₂CH—OH | H₂N—C₆H₃(OCH₃)—SO₂C₂H₄OSO₃H | Brown |
| 69 | naphthalene with SO₃H, SO₃H, NH₂ | " | " | CH₃OH | H₂N—C₆H₄—SO₂C₂H₄OSO₃H | " |
| 70 | naphthalene with SO₃H, SO₃H, NH₂ | naphthalene with NH₂, SO₃H | naphthalene with NH₂, SO₃H | " | H₂N—C₆H₄—SO₂CH=CH₂ | Bordeaux |
| 71 | " | " | naphthalene with NH₂, SO₃H | " | H₂N—C₆H₄—SO₂C₂H₄OSO₃H | " |
| 72 | " | " | " | C₂H₅OH | H₂N—C₆H₃(OCH₃)—SO₂C₂H₄OSO₃H | " |

| Example No. | Formula (II) | Formula (III) | Formula (V) | Formula (IX) | Formula (VII) | Color on cotton |
|---|---|---|---|---|---|---|
| 73 | naphthalene with SO₃H, SO₃H, SO₃H, NH₂ substituents | " | " | CH₃OH | H₂N—C₆H₄—SO₂C₂H₄OSO₃H | " |

EXAMPLE 74

The disazo compound obtained in Example 65 (0.1, 0.3 and 0.6 part) was respectively dissolved in water (200 parts), and sodium sulfate (10 parts) and cotton (10 parts) were added thereto. The bath was heated to 60° C., and then sodium carbonate (4 parts) was added thereto. The dyeing was continued for 1 hour. The cotton was washed with water, soaped, again washed with water and then dried to obtain each dyed product of a brown color having excellent fastness properties, particularly chlorine and perspiration-light fastness with good build-up property.

The disazo compound used was also found to have a good solubility and exhibit excellent level dyeing property with good reproducibility.

EXAMPLE 75

The disazo compound obtained in Example 69 (0.3 part) was dissolved in water (150 parts), and sodium sulfate (10 parts) and cotton (10 parts) were added thereto. The bath was heated to 70° C., and 30 minutes thereafter, sodium carbonate (4 parts) was added to the bath. Dyeing was continued for 1 hour at that temperature. Thereafter, the cotton was washed with water and then soaped to obtain a dyed product of a brown color having excellent fastness properties such as chlorine and perspiration-light fastness with good build-up property.

EXAMPLE 76

A mixture of 2-aminonaphthalene-4,8-disulfonic acid (9.1 parts) and concentrated hydrochloric acid (6.3 parts) in water (150 parts) was cooled to a temperature of between 0° and 10° C., and then mixed with a solution of sodium nitrite (2.1 parts) in water (4 parts), and the mixture was stirred for 1 hour at that temperature. Successively, 1-aminonaphthalene-7-sulfonic acid (6.7 parts) was added to the above diazonium liquor. The resulting mixture was adjusted to a pH of between 6 and 7 using a 20% strength aqueous sodium carbonate solution, and stirred for 2 hours at that temperature and that pH. The reaction mixture was adjusted to pH 8, and mixed with sodium nitrite (2.5 parts), and the resulting mixture was dropwise added to an 8% aqueous sulfuric acid over 1 hour, during which the temperature was kept within a range from 10° to 15° C. Stirring was further continued for 3 hours to complete diazotization. After decomposing excess nitrous acid, 1-aminonaphthalene-8-sulfonic acid (6.7 parts) was added to the above diazonium liquor, and the mixture was adjusted to a pH of between 6 and 7 using a 20% aqueous sodium carbonate solution, and stirred for 2 hours at that temperature. Cyanuric chloride (5.5 parts) was added to the reaction mixture, and the resulting mixture was stirred for 2 hours at a temperature of between 20° and 25° C., while controlling to a pH of between 6 and 7 using a 20% aqueous sodium carbonate solution. Sodium chloride (60 parts) was added to precipitate crystals, which were then collected on a suction filter. The wet cake obtained was mixed with water (300 parts), and p-phenolsulfonic acid (5.2 parts) was added thereto. The mixture was heated to a temperature of between 50° and 60° C., while controlling to a pH of between 5 and 6 using a 20% aqueous sodium carbonate, and then stirred for 10 hours at that temperature. Sodium chloride (90 parts) was added to precipitate crystals, which were then collected on a suction filter. The wet cake obtained was mixed with water (300 parts), and 1-aminobenzene-3-β-sulfatoethylsulfone (8.4 parts) was added thereto. The mixture was heated to a temperature of between 70° and 80° C., while controlling to a pH of between 4 and 5 using a 15% aqueous sodium carbonate solution, stirred for 4 hours at that temperature, and then cooled to 40° C. Sodium chloride (80 parts) was added to precipitate crystals, which were then collected on a suction filter, washed and dried at 60° C. to obtain a disazo compound of the following formula.

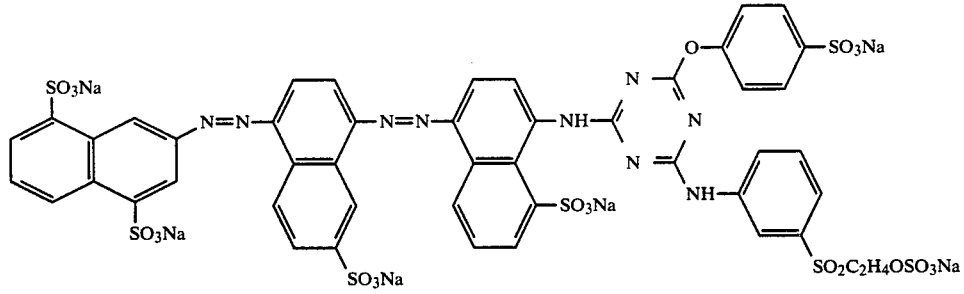

(λ max 482 nm)

EXAMPLE 77

Example 76 was repeated, provided that 1-aminonaphthalene-8-sulfonic acid was replaced by m-toluidine, then obtaining a disazo compound of the following formula.

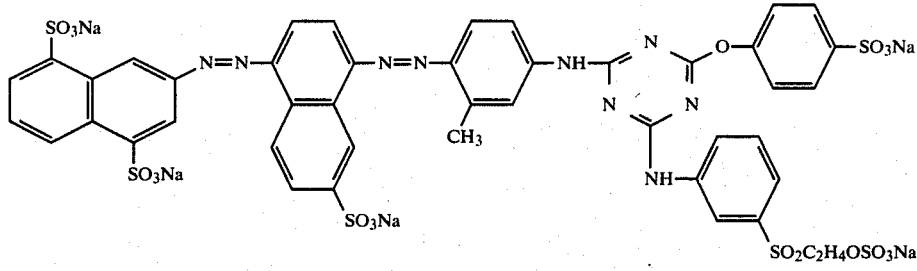

EXAMPLE 78

The disazo compound obtained in Example 76 (0.3 part) was dissolved in water (200 parts), and sodium sulfate (10 parts) and cotton (10 parts) were added thereto. The bath was heated to 70° C., and then sodium carbonate (4 parts) was added thereto. Dyeing was continued for 1 hour. The cotton was washed with water, soaped, again washed with water and then dried to obtain a dyed product of a bluish brown color having excellent fastness properties such as chlorine and perspiration-light fastness with good build-up property.

EXAMPLE 79

| Composition of color paste | |
|---|---|
| Disazo compound obtained in Example 36 | 5 parts |
| Urea | 5 parts |
| Sodium alginate (5%), thickener | 50 parts |
| Hot water | 25 parts |
| Sodium hydrogen carbonate | 2 parts |
| Balance | 13 parts |

A mercerized cotton broad cloth was printed with a color paste having the above composition, pre-dried, then steamed for 5 minutes at 100° C., washed with hot water, soaped, again washed with hot water, and then dried. Thus, a printed product of a brown color having excellent fastness properties was obtained.

What is claimed is:

1. A compound, or a salt thereof, represented by the following formula,

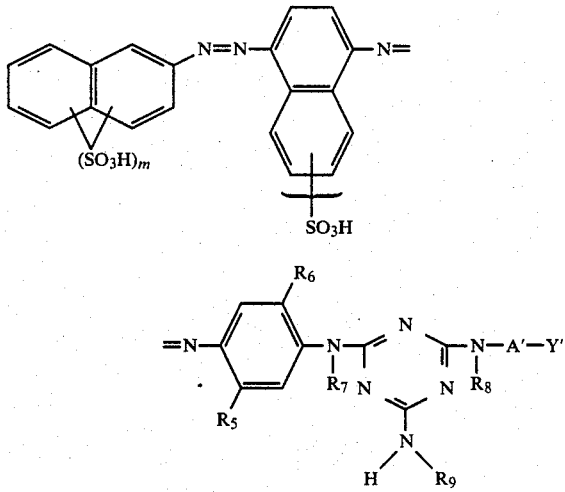

wherein $R_5$ is methyl, methoxy, acetylamino or ureido, $R_6$ is hydrogen, methyl, ethyl or methoxy, $R_7$ and $R_8$ are independently hydrogen, methyl or ethyl, $R_9$ is hydrogen, ethyl, phenyl unsubstituted or substituted with one or two sulfo groups or naphthyl unsubstituted or substituted with one or two sulfo groups, A' is phenylene unsubstituted or substituted with at least one of methyl and methoxy, or naphthylene which is unsubstituted or substituted with sulfo, and Y' is β-sulfatoethylsulfonyl or vinylsulfonyl, and m is 2 or 3.

2. A compound, or a salt thereof, represented by the following formula,

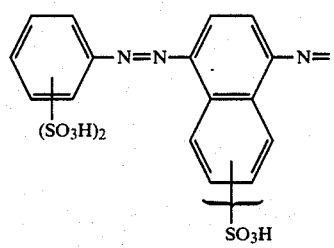

wherein $R_5$ is methyl, methoxy, acetylamino or ureido, $R_6$ is hydrogen, methyl, ethyl or methoxy, $R_7$ and $R_8$ are independently hydrogen, methyl or ethyl, $R_9$ is hydrogen, ethyl, phenyl unsubstituted or substituted with one or two sulfo groups or naphthyl unsubstituted or substituted with one or two sulfo groups, A' is phenylene unsubstituted or substituted with at least one of methyl and methoxy, or naphthylene which is unsubstituted or substituted with sulfo, and Y' is β-sulfatoethylsulfonyl or vinylsulfonyl.

3. A compound, or a salt thereof, represented by the following formula,

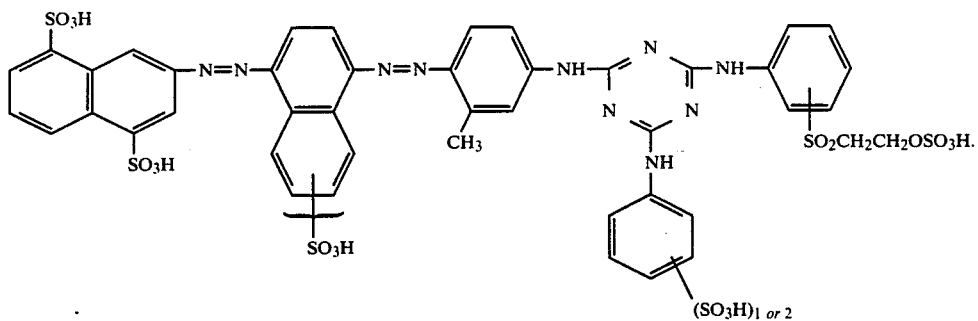
4. A compound, or a salt thereof, represented by the following formula,
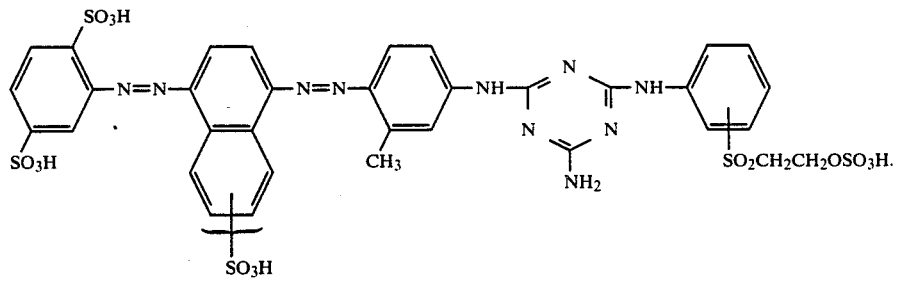
5. A compound, or a salt thereof, represented by the following formula,
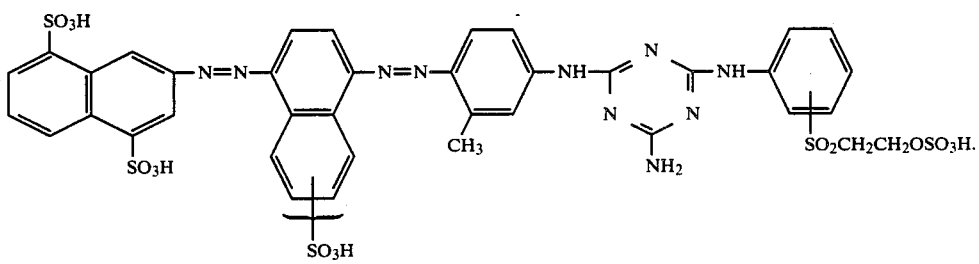
* * * * *